United States Patent [19]

Purser

[11] Patent Number: 4,973,841
[45] Date of Patent: Nov. 27, 1990

[54] PRECISION ULTRA-SENSITIVE TRACE DETECTOR FOR CARBON-14 WHEN IT IS AT CONCENTRATION CLOSE TO THAT PRESENT IN RECENT ORGANIC MATERIALS

[75] Inventor: Kenneth H. Purser, Lexington, Mass.

[73] Assignee: Genus, Inc., Mountain View, Calif.

[21] Appl. No.: 474,376

[22] Filed: Feb. 2, 1990

[51] Int. Cl.⁵ .................... H01J 49/28; B01D 59/48
[52] U.S. Cl. ................................ 250/282; 250/281; 250/296; 436/173
[58] Field of Search ............... 250/282, 281, 296; 436/173

[56] References Cited

U.S. PATENT DOCUMENTS 4,037,100  7/1977  Purser ............................ 250/282
4,489,237  12/1984  Litherland et al. ............ 250/282

Primary Examiner—Jack I. Berman
Attorney, Agent, or Firm—Henry C. Nields

[57] ABSTRACT

A method of detecting the amount of C-14 in a sample, comprising the following steps:
ionizing the sample to form a negative-ion beam; deflecting said beam in a magnetic field and directing the deflected beam through a first acceptance aperture to remove all negative ions except mass-14 particles; accelerating said mass-14 negative ions to an energy E of the order of 10 MeV by a high voltage electrostatic field; stripping three electrons from a majority of said negative ions to form doubly-charged positive ions; deflecting said doubly-charged positive ions in an electrostatic deflecting field through 180° and directing the deflected beam through a second acceptance aperture to remove particles in other than the 2+ charge state and particles with an energy other than E; accelerating the remaining particles to an energy of about 3E by said high-voltage electrostatic field; stripping an additional electron from about half of said 3E ions, whereby metastable mass-14 molecules are dissociated; directing the remaining 3E ions through a magnetic sector field which focuses the C-14 ions through a final defining aperture and onto a detector.

1 Claim, 2 Drawing Sheets

PRECISION ULTRA-SENSITIVE TRACE DETECTOR FOR CARBON-14 WHEN IT IS AT CONCENTRATION CLOSE TO THAT PRESENT IN RECENT ORGANIC MATERIALS

BACKGROUND OF THE INVENTION

1. Field of the Invention

This invention relates to accelerator mass spectrometry, wherein particles to be identified are accelerated as a beam and passed through electrostatic and magnetic fields and defining apertures which remove from the accelerated beam all particles except those to be identified.

2. Description of the Prior Art

Carbon-14, a radioactive isotope of the element carbon, decays to Nitrogen-14 with a half-life of 5730 years. It is often employed as a radioactive tracer by introducing it in the form of a C-14 labeled compound which follows the path and progress of chemical or physical processes.

Unlike many of the other radioactive isotopes that are used as tracers, the activity of C-14 does not decay significantly for several thousand years. Thus, after a tracer experiment has been conducted, the samples themselves and any other waste that may have been produced as part of the experimental procedure (needles, gloves, etc.) must be disposed of in an acceptable manner that produces a minimal insult to the environment. Because of the comparatively long life of C-14, it is anticipated that even low-level wastes will require underground burial for several tens of thousands of years. Even if such burial sites can be found, these procedures are clearly time consuming and expensive and as a consequence it may be the case that the use of C-14 as a tracer is presently being seriously handicapped by the problems of disposal.

The detection of minute concentrations of a radioactive tracer by the observation of the radioactive decay of single atoms is a well understood art. However, as the half life of the tracer used increases, the time taken to carry out an efficient measurement, where most of the radioactive atoms are actually detected naturally increases; as an example for C-14 which has a half life of 5730 years, efficient detection of the introduced radioactive atoms is impossible unless the experiment can continue for about 10,000 years. For this reason trace measurements involving long-lived radioactivities are highly inefficient and require the use of large numbers of radioactive atoms, only a small fraction of which can be detected during the measurement.

SUMMARY OF THE INVENTION

The present invention discloses the details of a new instrument which can be used for the detection of C-14 in tracer applications. The features of this new instrument are: it is small and will operate in a normal laboratory environment; secondly, it will detect concentrations of C-14 more than 100 times lower than those used in conventional trace isotope measurements; thirdly, the size of the sample needed for such measurements can be as much as 1000 times smaller than that required using the existing techniques.

Using the apparatus disclosed here, C-14 concentrations that are only a factor of two or three above the natural concentration levels of C-14 in the biosphere can be rapidly, reliably and accurately detected making unnecessary the use of highly active carbon-14 chemicals. At the low levels that will only be required for trace measurements using the disclosed apparatus, disposal techniques should be simple: incineration followed by stack gas dilution can be reasonably employed to produce a released activity that is below the natural level of C-14 in the atmosphere.

In the present invention the aforementioned inherent inefficiency of radioactive decay methods is largely overcome because the C-14 nuclei are not detected by their radioactive emissions but rather by mass spectrometric detection of individual atoms. The great advantage of this direct atom counting technique over detection by radioactive decay can be illustrated by an example:

In a 1 milligram sample of modern carbon (from wood or animal products) there is approximately $5.10^7$ C-14 nuclei; this collection of atoms will gradually decay at a rate of approximately 0.8 disintegrations per hour: Clearly, months are needed for a 1% measurement even if the background problems from cosmic rays can be addressed. In contrast, if the number of C-14 nuclei in the same sample is measured using the mass-spectrometry procedures described below, it is possible to reliably detect more than 2% of the total C-14 nuclei present at a rate greater than 30 events/second; the concentration of C-14 can be measured with a precision better than 1% after a few minutes.

BRIEF DESCRIPTION OF THE DRAWINGS

The invention may best be understood from the following detailed description thereof, having reference to the accompanying drawings, in which.

DESCRIPTION OF THE PREFERRED EMBODIMENT

The basic principles of the Accelerator Mass Spectrometry (AMS) instrumentation underlying the present invention has been described by K.H. Purser in U.S. Pat. No. 4,037,100 and by K.H. Purser, R.B. Liebert and C.J. Russo in Radiocarbon 22, (1980) 794. In these articles it is shown how it is possible to avoid the problems of molecular interferences and to use the techniques of mass spectrometry to measure directly the number of C-14 atoms in a sample and thus avoid the problems of waiting for the atoms to decay.

Figure 1:
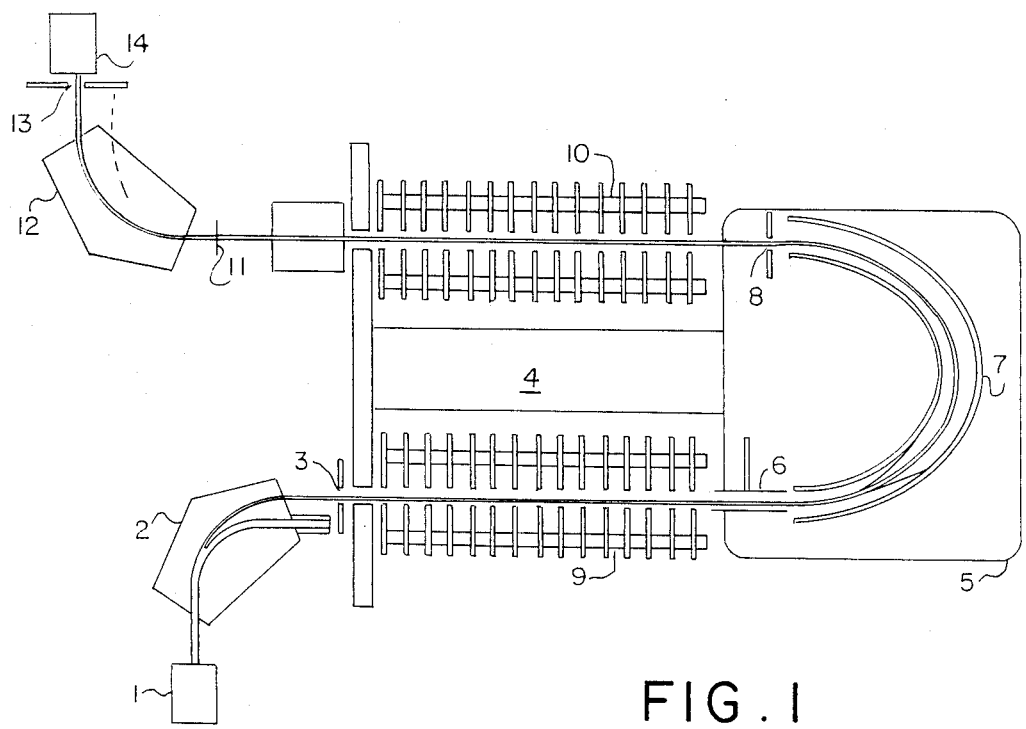
FIG. 1 is a schematic illustration of the overall apparatus of the invention.

A block diagram of the essential elements of the C-14 detection apparatus of the present invention is shown in FIG. 1. Negative carbon ions, from a source (1) which will produce 50–100 microamperes of C—, are mass analyzed by deflection in a magnetic field (2) so that only mass 14 particles pass through the acceptance aperture (3). While such a magnetic deflector is convenient for use in the present apparatus, it will be clear to those skilled in the art that other types of mass separator could be used to differentiate the mass-14 particles from the other components of the beam. It is important to note that for high sensitivity, all optical elements in the system must accept as much beam from the source as possible and transport it with minimal loss to the final detector. In the present invention a split-pole magnetic spectrometer with second and third-order corrections to maximize the acceptance solid angle is used for mass analyzing the negative ions.

it should be noted that not only C-14 ions pass through the aperture (3) but also there is a contribution from almost equal mass-14 molecules, such as $^{13}CH-$ and $^{12}C_2-$. This molecular background contribution may have an intensity as much as eight orders of magnitude greater than that from the wanted C-14 atoms and represents one of the greatest obstacles to the direct detection of C-14 by mass spectrometers.

While many types of ion source are possible for the generation of C— ions, for the present invention a direct extraction ion source is desirable and the most convenient has proven to be a negative sputter ion source based on the prior art of Middleton; see NIM 122, 1974, 35-43. This negative ion source, which can use solid graphite or carbon dioxide gas as a feed material, produces a high yield of C— ions (up to 100 microamperes), has a high ion/source feed efficiency (up to 10%) and discriminates strongly against the production of N— it will be noted that the ion source (1) must produce negative C— ions rather than positive ions, C+. The reason for this is two-fold: Firstly, with negative ions it is possible to use a tandem accelerator where the ion source and the target are both at ground potential, thus simplifying the accelerator design and the maintenance of the system. Secondly, N— ions are unstable and have a half life so short that nitrogen ions cannot be accelerated through the complete AMS apparatus and into the detector; this very fortunate property of the N— ion simplifies AMS C-14 detection significantly. This simplification comes about because one of the most serious problems of low-level radioactive isotope mass spectrometry is interference from the isobaric nucleus which is always present when a radioactive nucleus decays by beta emission or internal conversion.

In the present invention, the power supply (4) for the tandem accelerator need only have a maximum potential of 0.75MV. This voltage is necessary to accelerate the ions to the appropriate energy for charge exchange and molecular dissociation in the gas canal (6). This voltage, which is small for most tandem designs, allows the use of a small size instrument with a minimum amount of stored electrostatic energy. The power supply needs to have a large current capacity to allow substantial currents to be drained down the resistive voltage divider chains. In the preferred embodiment it is anticipated that a parallel fed Cockcroft Walton high voltage power supply will be used similar to that described in U.S. Pat. No. 2,875,394 by Cleland and also employed in the Tandetron accelerator manufactured by General Ionex Corporation of Newburyport, Massachusetts. Those skilled in the art of D.C. power supply design will recognize that other types of power supply, such as a Van de Graaff generator could be equally well employed, provided that they are of adequate stability and can generate the necessary high currents. Also, it will be clear to those skilled in the arts of tandem acceleration that higher or lower voltages could also be used successfully.

In FIG. 1 it can be seen that in the present invention the mass selected, single charge negative ions from the source are accelerated through an acceleration tube (9), made up of apertured electrodes separated by insulators, to the high voltage terminal (5) so that they have gained an energy of 0.75 MeV. In the terminal the ions are directed through a gas cell (6) where electrons are stripped from the ions so that the polarity of the ions are converted from negative to positive. At an energy of 0.75 MeV approximately 55% of the ions leaving the cell (6) will have had three electrons removed from the negative ion and converted into the 2+charge state.

Figure 2:
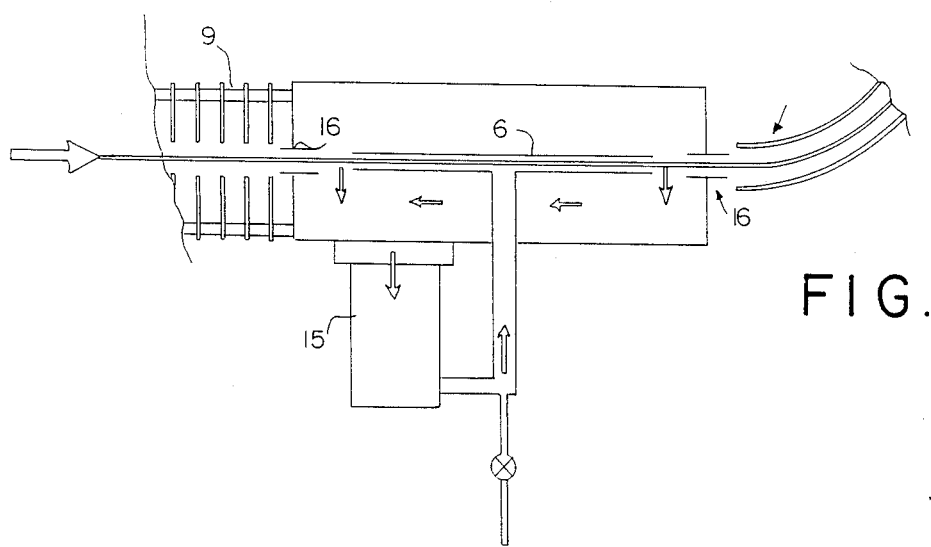
FIG. 2 is a detail, on an enlarged scale, of a portion of the apparatus of FIG. 1.
Figure 3:
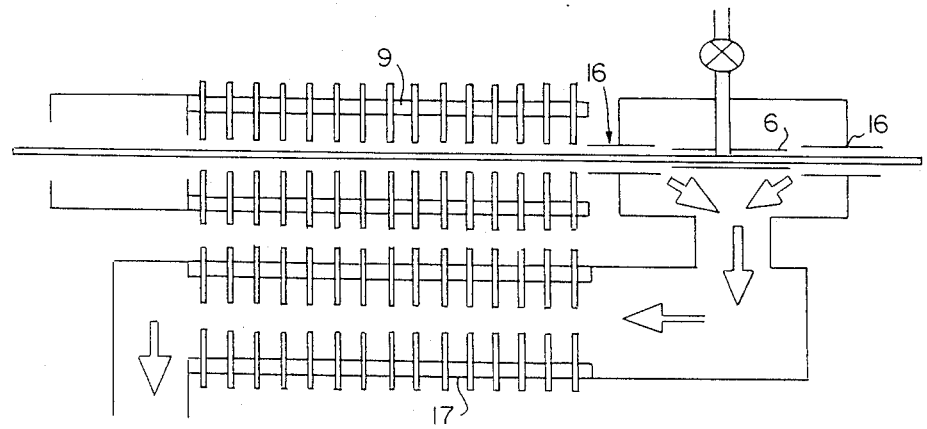
FIG. 3 is a detail of an alternative to the apparatus of FIG. 2.

It is important that an excessive amount of gas from the gas cell (6) does not enter the acceleration region (9) and cause premature loss of the ions by stripping; some form of pumping is essential. While those skilled in the art will recognize that a variety of pumping schemes could be adopted, FIGS. 2 and 3 show two preferred techniques. In FIG. 2, the gas which leaves the ends of the stripper gas tube (6) is compressed by a turbomolecular pump (15) and the gas is then directed back to the center of the canal (6). Two small diameter tubes (16) at the each end of the gas canal (6) act as impedances to the flow of gas and ensure that the flow of gas into the acceleration tubes is small.

A second possibility for terminal pumping, shown in FIG. 3, involves the use of a third vacuum envelope (17), consisting of suitably shaped electrodes separated by insulators, in addition to the acceleration tubes (9) and (10) (see for example U.S. Pat. No. 3,308,323 to Van de Graaff). In this system the gas is once again prevented from flowing down the acceleration tubes by impedances (16). The isolation provided by the tube (17) permits all of the active pumping equipment to be outside of the accelerator pressure vessel and requires no mechanical moving parts in the high voltage terminal (5).

In the invention described here, the 2+ ions leaving the gas cell (6) are deflected through 180° by an electrostatic deflector located within the high voltage terminal (5). in the preferred embodiment, the electrostatic deflector (7) would have a radius of curvature of approximately 250 millimeters, although this radius of curvature is not critical. Those ions accepted for a second stage of tandem acceleration must pass through the charge-state defining aperture (8).

From an operational point of view, the 180° electrostatic deflector (7), which could be double focusing, selects those particles which both are produced as atoms in the ion source and leave the terminal gas cell (6) in the 2+ charge state; particles in other charge states and with an energy other than 750keV are rejected. Molecular fragments produced in the gas cell (6) are rejected because, when $^{13}CH-$ molecules dissociate in the gas cell (6), the residual $^{13}C++$ have an energy of only 13/14 of 750keV or 696keV. These ions are deflected to a point approximately 36mm distant from the center of the defining aperture (8) in the geometry which uses the above preferred electrostatic deflector of radius 250mm, and so are rejected before the second stage of tandem acceleration (10). In a similar manner, the residual $^{12}C++$ from the dissociation of $^{12}CH_2-$ are also completely rejected at the defining aperture (8). In effect, the only particles accepted by the high energy acceleration tubes are $C^{14}++$ ions or a very small contribution from metastable $^{13}CH++$ and $^{12}CH^2++$ which are thought to have a half life of about 10 microseconds.

Even though the fraction is small for those molecular fragments which pass into the $^{13}CH++$ and $^{12}CH^2++$ states, the absolute numbers of these background particles can still be large and a further filtering is essential. The filtering adopted in this disclosure to ensure complete elimination is to direct the ions through a thin carbon foil (11) located after the second stage of tandem acceleration (10). At the location of the carbon dissociator foil (11) the energy of the C-14 ions is approximately 2.3MeV and approximately 50% of the ions which pass through the defining aperture (8) transfer into the 3+ charge state. The importance of this dissociator foil is that any metastable mass-14 molecules are completely dissociated by Coulomb explosion when they transfer into the 3+ charge state. Experiments described by Litherland (Proc. 1st Conference on Radiocarbon Dating with Accelerators; H.E.Gove editor 1978, pages 70-113) indicate that the use of charge state 3+ ions ensures that all molecules are destroyed.

An alternative method for eliminating the residual molecular contribution can be used based upon the work reported by H.W. Lee and K.H. Chang of the University of Toronto. These workers showed an exponential decrease in the number of molecular ions as a function of the stripper gas pressure. In the present invention the practical implementation of this observation would be to increase the pressure of gas at the center of the dissociator cell (6).

A charge-state analyzer (12) at ground potential, consisting of a magnetic sector field which focuses the wanted ions through the final defining aperture (13) selects only those ions which have been stripped to the 3+ charge state and ensures that all molecular fragments are rejected. The only mass-14 particles which reach the detector after the second magnetic separator are C-14 or N-14.

It will be clear to any person skilled in the art of ion optics that a variety of optical elements could be used as a second mass separator to follow the second tandem acceleration stage and effect rejection of unwanted particles. Such elements might include a time-of-flight velocity selector, an electrostatic deflector or a crossed-field Wien filter.

Final Detector

An important feature of the invention described here is that the final energy of the ions is sufficiently high that they can be stopped in an appropriate energy sensitive detector making possible an accurate measurement of the final kinetic energy of the particle and its rate of energy loss. The importance of this final measurement is that it makes possible an unambiguous identification of the C-14 events and separates them cleanly from any $^{13}C$ or $^{12}C$ fragments which may have been scattered from the walls of the vacuum system into the detector. In addition any $^{14}N$ fragments which may have originated from hydride molecules in the ion source can be uniquely identified.

In this invention the final energy measurement is accomplished using a gas ionization detector (14). The preferred detector is operated with approximately 2.0 kPa of isobutane separated from the main vacuum region of the acceleration by an approximately 400 microgram/cm$^2$ thick self supporting window. It will be clear to any person skilled in the art that a variety of final energy detectors such as lithium drifted solid state detectors could be substituted in place of the gas counter shown here.

Auto Stability

Figure 4:
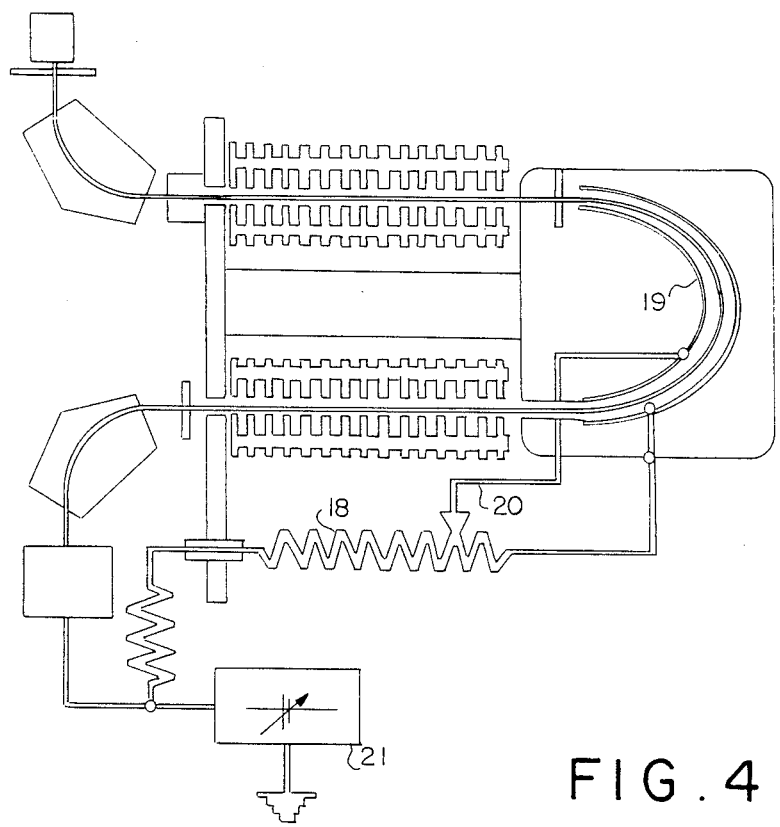
FIG. 4 is a schematic illustration, similar to that of FIG. 1, showing an important feature of the invention.

FIG. 4 shows an important feature which ensures stability of the instrument. The voltage needed for the electrostatic deflector is derived as shown from the terminal potential and the ion source potential. The current which flows down the resistor chain (18) is directly proportional to the energy of the ions when they arrive at the entrance to the charge exchange canal (6). Thus, if the potential to drive the electrostatic deflector (19) is derived from a suitable section of this resistor chain the electric deflection field will scale linearly with the energy of the ions when they reach the high voltage terminal. A simple resistor tap arrangement (20) can be used to change the ratio of the voltage across the plates to the energy of the ions reaching the terminal, making possible the transmission of other beams through the system and for tuning purposes. Because the deflection voltages are derived from a simple resistor divider arrangement (18) the voltage stability of the high voltage terminal (5) does not need to be highly precise which guarantees good particle transmission through the aperture (8) at all times.

I claim:

1. A method of detecting the amount of C-14 in a sample, comprising the following steps:
    ionizing the sample to form a negative-ion beam;
    deflecting said beam in a magnetic field and directing the deflected beam through a first acceptance aperture to remove all negative ions except mass-14 particles;
    accelerating said mass-14 negative ions to an energy E of the order of $10^5$ MeV hy a high voltage electrostatic field;
    stripping three electrons from a majority of said negative ions to form doubly-charged positive ions;
    deflecting said doubly-charged positive ions in an electrostatic deflecting field through 180° and directing the deflected beam through a second acceptance aperture to remove particles in other than the 2+ charge state and particles with an energy other than E;
    accelerating the remaining particles to an energy of about 3E by said high-voltage electrostatic field;
    stripping an additional electron from about half of said 3E ions, whereby metastable mass-14 molecules are dissociated; directing the remaining 3E ions through a magnetic sector field which focuses the C-14 ions through a final defining aperture and onto a detector.

* * * * *